United States Patent [19]

Funabiki et al.

[11] 4,252,700
[45] Feb. 24, 1981

[54] RESIN BINDER FOR FOUNDRY SAND CORES AND MOLDS

[75] Inventors: Kyohei Funabiki; Noriaki Matsushima; Naomitsu Inoue, all of Fujieda, Japan

[73] Assignee: Sumitomo Durez Company, Ltd., Tokyo, Japan

[21] Appl. No.: 38,380

[22] Filed: May 11, 1979

Related U.S. Application Data

[63] Continuation-in-part of Ser. No. 865,558, Dec. 29, 1977, Pat. No. 4,196,114, and a continuation-in-part of Ser. No. 863,548, Dec. 22, 1977, abandoned, and a continuation-in-part of Ser. No. 863,546, Dec. 22, 1977, Pat. No. 4,157,993.

[51] Int. Cl.$^3$ .............................................. C08L 91/06
[52] U.S. Cl. ........................................ 260/25; 164/43; 260/28 P; 260/38; 525/501
[58] Field of Search ................... 106/38.2; 260/28 P, 260/38, DIG. 40, 25; 164/43; 525/501

[56] References Cited

U.S. PATENT DOCUMENTS

| | | |
|---|---|---|
| 3,917,555 | 11/1975 | Worschech et al. .................. 260/38 |
| 3,944,514 | 3/1976 | Nishiyama et al. .................... 260/38 |
| 4,094,834 | 6/1978 | Bowers et al. ............. 260/DIG. 40 |
| 4,097,443 | 6/1978 | Nakamura .............................. 260/38 |
| 4,111,253 | 9/1978 | Epstein et al. ............... 260/DIG. 40 |
| 4,157,993 | 6/1979 | Funabiki et al. ................... 260/28 P |

FOREIGN PATENT DOCUMENTS 1009783  5/1977  Canada.

*Primary Examiner*—Lorenzo B. Hayes
*Attorney, Agent, or Firm*—Peter F. Casella; James F. Mudd; David A. Stein

[57] ABSTRACT

This invention relates to a solid phenolic resin composition useful as a binder in the preparation of foundry sand cores and molds which comprises a solid novolac resin and a lubricant-containing solid resole resin wherein the lubricant is incorporated into the resole during the preparation of the solid resole. In a preferred binder composition, the resole component of the binder is prepared in the presence of an alkali metal catalyst and an amine catalyst. The invention also includes the process for preparing sand containing foundry cores and molds from the preferred binder composition and the sand foundry core and mold products of said process.

21 Claims, No Drawings

RESIN BINDER FOR FOUNDRY SAND CORES AND MOLDS

CROSS-REFERENCE TO RELATED APPLICATIONS

This application is a continuation-in-part of the copending U.S. applications of K. Funabiki, M. Matsushima, and N. Inoue, Ser. No. 863,546 filed Dec. 22, 1977, now U.S. Pat. No. 4,157,993; Ser. No. 863,548 filed Dec. 22, 1977 now abandoned and Ser. No. 865,558 filed Dec. 29, 1977, now U.S. Pat. No. 4,196,114.

BACKGROUND OF THE INVENTION

This invention is directed to resin-coated sand compositions and to a process for the preparation thereof, and more particularly, to an improved resin binder for producing resin-coated sand compositions substantially free of nitrogen by the dry hot coating method. The improved binder compositions provide improved foundry sand cores and molds.

Conventional resin-coated sand compositions have been typically prepared by the dry hot coating method by mixing heated sand particles with a novolac phenolic resin (hereinafter referred to as a novolac resin) in the form of an agitated aqueous solution, adding hexamethylenetetramine (hereinafter referred to as hexamine) as a hardening agent, in an amount of 10 to 15 parts by weight with respect to 100 parts by weight of resin, and further adding calcium stearate.

Such resin-coated sand compositions produced with novolac resins and hexamine exhibit fast curing and excellent flow, but are also often associated with certain drawbacks such as pollution problems and defects in the cast products, such as pinholes or blow holes resulting from the presence of nitrogen compounds, such as ammonia or formaldehyde, generated by the pyrolysis of hexamine when the resin-coated sand compositions are used in iron or steel casting or when forming molds.

In order to avoid such problems, various attempts have been made to employ a shell molding resin with a very low nitrogen content when using dry hot coating methods. A representative attempt in this direction is the use of a solid resole phenolic resin obtained with an ammonia catalyst (hereinafter referred to as a solid ammonia resole resin).

This method is, however, associated with certain drawbacks such as slower hardening as compared to novolac resins cured with hexamine, and unsatisfactory flow (insufficient hot flow) resulting from premature local curing before the sand particles become well-coated in the course of mulling. As a result, the cured articles frequently exhibit significantly lower physical strength than those obtained with a novolac resin and hexamine, and, therefore, this method has not been extensively employed in practice. A method has also been proposed for controlling the degree of reaction of a solid ammonia resole resin in the earlier stages of reaction in order to accelerate the hardening. However, this method still results in insufficient hot flow and thus in insufficient strength of the molded articles.

In addition, a method has been proposed for using a solid ammonia resole resin as a curing agent for novolac resins. This method, though effective for improving the physical strength of the molded article, is associated with the serious drawback of slow curing.

The present inventors have found that these problems can be solved by using, as a curing agent for novolac resins, a lubricant-containing solid resole phenolic resin having a higher content of methylol radicals (hereinafter referred to as a lubricant-containing solid resole resin). The presence of a lubricant in the resin elevates the apparent melting point and thus improves its resistance against blocking.

As this method provides a solid resole resin having a high degree of reactivity (with a higher content of methylol radicals), it is possible to obtain a coated sand composition with a fast curing speed and with a higher crosslinking density. Also, the uniform distribution of lubricant in the solid resole resin assures an improvement in hot flow and uniform mixing with the novolak resin.

Accordingly, it is an object of the present invention to provide a process for producing a resin-coated sand composition having good physical strength and rapid curing by means of the dry hot coating method.

Another object of the present invention is to provide a process for producing a resin-coated sand composition capable of substantially eliminating gas defects in cast products and also capable of preventing the various associated pollution problems.

A still further object of the present invention is to provide a process which utilizes a stable supply of a reactive binder substantially free of blocking characteristics and which provides for the simplified preparation of a more reactive solid resole resin.

SUMMARY OF THE INVENTION

Aforementioned copending U.S. application Ser. No. 863,546, of which this application is a continuation-in-part, is directed to an improved foundry sand composition comprising sand, a solid novolac resin, a lubricant-containing solid resole resin reactive with said novolac resin, and optionally, hexamine present in an amount of up to about 5 parts by weight based on 100 parts by weight of the total amount of resin. Also, a binder composition comprising lubricant-containing resole for coating sand in the preparation of sand foundry cores or molds is disclosed in the aforementioned copending U.S. application Ser. No. 865,558 of which this application is also a continuation-in-part.

The present invention is directed to the resin binder employed for coating the sand in the process of the aforementioned U.S. application Ser. No. 863,546, i.e. to a solid particulate binder mixture comprising a solid novolac resin and a solid lubricant-containing resole resin wherein the lubricant is added to the reaction mixture employed to prepare the resole prior to or during the reaction employed to prepare the solid resole resin.

In preferred resin binder compositions of the invention the resole component of the resin binder is prepared in the presence of an alkali metal catalyst and an amine catalyst. The invention also is directed to the process of preparing foundry sand cores and molds employing the aforementioned preferred resin binder composition and to the sand containing foundry cores and molds so obtained. The use of the combination of an alkali metal catalyst and an amine catalyst for preparing a binder composition comprising lubricant-containing resole resin for coating sand in foundry sand cores or molds is disclosed in the aforementioned copending U.S. application Ser. No. 863,548, of which this application is also a continuation-in-part.

The use of a lubricant-containing solid resole resin as a curing agent for the novolac resin in the preparation of resin-coated sand compositions provides satisfactory hot flow without substantial adverse blocking effects, and also provides the following significant advantages:

(1) The substantial absence of defective castings and disagreeable odors due to gas formation;

(2) Satisfactory hot flow and uniform mixing of the lubricant-containing resole with the novolac due to the presence of the lubricant, and satisfactory cure speed due to a higher content of reactive radicals in the solid resole resin;

(3) A higher crosslinking density, and a resulting increase in strength of the molded articles, due to the use of a novolac resin in combination with a solid resole resin having a higher content of reactive radicals; and (4) The lack of, or very limited need for, the addition of a lubricant, such as calcium stearate, in the blending process for the preparation of resin-coated sand compositions thus facilitating the blending operation.

DESCRIPTION OF THE PREFERRED EMBODIMENTS

The lubricant-containing solid resole resin employed in the present invention may be obtained by incorporating a lubricant into the base resin prepared by reacting 1 mole of phenol with at least 1 mole of formaldehyde in the presence of an alkaline catalyst.

Suitable solid resole resins include ammonia solid resole resins, prepared by using an amine catalyst such as ammonia or an amine compound, solid resole resins prepared by using an alkali metal catalyst alone and preferably solid resole resins prepared by the combined use of an amine catalyst and an alkali metal catalyst.

The phenolic reactant employed in the present invention to prepare the novolac or resole resin can be phenol, an alkylphenol such as m-cresol, p-cresol, xylenol or mixtures thereof.

As source of formaldehyde, in addition to formalin, formaldehyde polymers such as paraformaldehyde or trioxane, or mixtures thereof, can be advantageously employed. In addition, hexamine can be employed not only as a catalyst, but also in combination with ammonia as a source of formaldehyde.

Examples of suitable amine catalysts are ammonia, monomethylamine, triethylamine, ethanolamine, an aniline, such as o, m or p-toluidine, p-ethyl aniline or aniline itself. Mixtures of the aforementioned amine catalyst can also be used. Preferably the amine catalyst is ammonia.

Typical examples of suitable alkali metal catalysts are the alkali hydroxides and oxides, i.e. hydroxides and oxides of metals of Group IA of the Periodic Table such as sodium, potassium, and lithium, and the alkali earth hydroxides and oxides, i.e. hydroxides and oxides of metals of Group IIA of the Periodic Table such as barium, calcium and magnesium. Mixtures of the aforementioned alkali and alkali earth catalysts can also be used. The preferred alkali catalyst is sodium hydroxide and the preferred alkali earth catalyst is barium hydroxide.

Typical examples of suitable lubricants are carnauba wax, montan wax, paraffin wax, polyethylene wax, aliphatic amides such as ethylene bis-stearamide, methylene bis-stearamide, oxystearamide, stearamides, linoleic amide, etc., aliphatic acid salts such as calcium stearate, rosin, "Vinsol" resin (a complex thermoplastic mixture derived from southern pinewood comprising phenolic constituents in the form of substituted phenolic ethers, polyphenols and phenols of high molecular weight), polyethylene glycol, polystyrene, talc, etc. The preferred lubricant is an aliphatic amide or polyethylene wax.

Such a lubricant can be added prior to, during, or after the preparation of the solid resole resin to obtain a lubricant-containing solid resole resin. In order to achieve a homogeneous dispersion, the lubricant is added preferably prior to or during the reaction to prepare the solid resole and preferably in the form of a dispersion. The amount of lubricant employed may vary within a range of about 0.5 to about 10 parts by weight based on 100 parts by weight of the lubricant-containing solid resole resin, and preferably within a range of about 1 to about 7 parts by weight to achieve a more satisfactory hot flow and cure speed.

The following examples will serve to illustrate the process for producing the lubricant-containing solid resole resin of the present invention:

(1) One mole of phenol and 1-3 moles of formaldehyde are placed in a reactor, and an alkaline catalyst is added thereto prior to the addition of a lubricant. The mixture thus obtained is subjected to a condensation reaction for about 30 minutes to 2 hours at a temperature of 50° C. to 100° C. (The lubricant is preferably added after completion of the condensation reaction or subsequently during the course of dehydration.) The reaction mixture is then subjected to dehydration under reduced pressure and at a temperature not exceeding 100° C. to obtain a highly viscous yellow or brownish-yellow resin, which is removed from the reactor, rapidly cooled and crushed to obtain a lubricant-containing solid resole in solid state.

(2) One mole of phenol and 1-3 moles of formaldehyde are placed in a reactor and an alkaline catalyst is added. The mixture obtained is subjected to a condensation reaction for about 30 minutes to 2 hours at a temperature of 50° C. to 100° C. A dispersion of a lubricant is then added to the reaction mixture with a silane coupling agent, such as aminosilane or epoxysilane, and rapidly dried to obtain a lubricant-containing solid resole resin in flake or granular form.

(3) A lubricant-containing solid resole resin can also be obtained by incorporating a lubricant into a solid resole resin modified by a modifier capable of reacting with formaldehyde such as resorcin, urea, melamine, cashew nut shell oil, etc.

The novolac resin employed in the present invention is a solid condensate with a melting point of 70° C. to 100° C. prepared by the reaction of phenol and formaldehyde in the presence of an organic or inorganic acid catalyst such as oxalic acid, hydrochloric acid, sulfuric acid, p-toluenesulfonic acid or zinc acetate, followed by dehydration, said condensate being obtainable in flake, granular or rod shaped forms. Furthermore, in addition to ordinary novolac resins, so-called high ortho-novolac resins are also included in the novolac resins employed in the present invention. The preparation of suitable high ortho-novolac resins is fully described in U.S. Pat. No. 3,425,989, to Shepard et al., the disclosure of which is incorporated herein by reference.

The novolac resin thus obtained is a thermoplastic. Hexamine is a representative curing agent for the novolac, but it is associated, as explained in the foregoing, with certain disadvantages such as defects in cast products and with disagreeable odors due to the formation of gas. Also, as explained in the foregoing, a solid resole resin is unsatisfactory as a curing agent due to its slow cure speed, although it is not associated with the above-mentioned disadvantages.

The amount of novolac employed should preferably be in the range of about 1 part by weight to about 30 parts by weight based on 100 parts by weight of the total amount of resin binder, i.e. of novolac resin and lubricant-containing resole resin, employed. The upper limit can be increased to about 40 parts by weight if hexamine is employed.

To obtain the resin binder composition of the invention, the solid novolac resin may be pulverized or otherwise converted into any convenient particle shape such as flakes, granules or rods and admixed, using a conventional mixing technique, with the solid lubricant-containing resole resin which has been similarly rendered pulverulent.

The resin-coated sand compositions of the present invention can be prepared by placing sand, preheated to 120° C. to 140° C., i.e. at an elevated temperature sufficient to fluidize the solid resin binder composition, into a muller, adding the present resin binder composition of solid novolac resin and lubricant-containing solid resole resin, desirably in particulate form, and, if necessary, adding a small amount of hexamine dissolved in the cooling water, and continuing the mulling until the sand lumps are crushed, with the addition, when required, of a small amount of calcium stearate. The total resin binder content of the sand-containing foundry core or mold composition will preferably be in the range of about 2 to about 5 parts by weight based on 100 parts by weight of sand.

In the preferred embodiment of the invention wherein the resole resin is prepared in the presence of a combination of an alkali metal catalyst and an amine catalyst the proportion of the alkali metal catalyst employed is generally in the range of about 0.002 to about 0.10 mole per mole of the phenolic reactant employed to prepare the resole resin and the proportion of amine catalyst is generally about 0.05 to about 0.40 mole per mole of the phenolic reactant employed to prepare the resole resin.

When the alkali metal catalyst of the preferred catalyst combination of the invention is an alkali hydroxide, such as sodium hydroxide, potassium hydroxide or lithium hydroxide, the preferred proportion of alkali metal catalyst is in the range of about 0.01 to about 0.1 mole per mole of the phenolic reactant. When the alkali metal catalyst of the preferred catalyst combination of the invention is an alkali earth hydroxide, such as barium hydroxide, calcium hydroxide or magnesium hydroxide, the preferred proportion of the alkali metal catalyst is in the range of about 0.002 to about 0.02 mole per mole of the phenolic reactant. As is exemplified below, the preferred use of an alkali metal catalyst and an amine catalyst in accordance with the invention results in an enhanced curing speed in production of the sand-containing foundry core and mold products of the invention and further results in a sand-containing foundry core and mold products of enhanced strength.

The present solid resin binder compositions have satisfactory stability, i.e. satisfactory shelf life, prior to admixture with sand to prepare sand foundry cores and molds. In accord with the technology of the hot coating method of preparing resin binder-coated sand foundry cores and molds, the present binder compositions as prepared in accordance with the invention are generally devoid of a reinforcing filler additive.

The present invention will be further elucidated by the following examples which are not intended to limit the scope thereof. The amounts and percentages in the specification and claims are represented by parts by weight and percent by weight unless specifically defined otherwise.

EXAMPLE 1

2000 parts of phenol and 1350 parts of 37% formalin were placed in a reactor, and 15 parts of 10% hydrochloric acid was added. The mixture was heated to 100° C. and reacted under reflux for 3 hours. The reaction mixture was subjected, successively, to dehydration under a reduced pressure of 30–65 cmHg, then removed from the reactor when the internal temperature rose to 160° C., allowed to cool, and crushed to obtain a novolac resin in granular form.

EXAMPLE 2

2000 parts of phenol and 2590 parts of 37% formalin were placed in a reactor, and 160 parts of a 28% ammonia solution was added. The mixture was gradually heated to 100° C. and reacted under reflux for 30 minutes. After the addition and mixing of 100 parts of methylene bis-stearamide, the reaction mixture was subjected to dehydration under a reduced pressure of 30–50 cmHg, then removed from the reactor when the internal temperature rose to 82° C., rapidly cooled and crushed to obtain a solid resole resin with a melting point of 97° C. in granular form. The solid resole resin thus obtained was found to have no blocking characteristics.

EXAMPLE 3

2000 parts of phenol and 2590 parts of 37% formalin were placed in a reactor, and 160 parts of a 28% aqueous ammonia solution and 60 parts of a 50% aqueous solution of sodium hydroxide were added. The mixture was gradually heated to 100° C. and reacted under reflux for 30 minutes. After the addition of 100 parts of ethylene bis-stearamide and dispersion by admixture, the mixture was subjected to dehydration under a reduced pressure, then removed from the reactor when the internal temperature reached 82° C., cooled rapidly and crushed to obtain a solid resole resin with a melting point of 97° C. in granular form. The solid resole resin thus obtained was found to have no blocking characteristics.

REFERENCE EXAMPLE 1

2000 parts of phenol and 2590 parts of 37% formalin were placed in a reactor, and 160 parts of a 28% aqueous ammonia solution was added. The mixture was gradually heated to 100° C. and reacted under reflux for 30 minutes. The mixture was subjected successively, to dehydration under a reduced pressure of 30–50 cmHg, removed from the reactor when the internal temperature rose to 95° C. cooled rapidly and crushed to obtain a solid resole resin having a melting point of 85° C. in granular form.

The conditions for preparation of resin-coated sand compositions, together with the properties thereof, based on the novolac resin obtained in Example 1 and the solid resole resin obtained in Examples 2 or 3, or Reference Example 1, in some cases with hexamine, are summarized in Table 1 below.

The method of preparation of the resin-coated sand and the methods of testing were as follows:

1. Preparation of resin-coated sand:

30 Kg of "Ayaragi" silica sand preheated to 130°–149° C. was placed in a Wahl mixer. A novolac resin (Example 1) and a solid resole resin were added and mulled with the silica sand for 40 seconds. 450 g. of water (in which a predetermined amount of hexamine, if required, is dissolved) was added, and mulling was continued until the sand particles were crushed. After the addition of 20 g. of calcium stearate, the mixture was further mulled for 20 seconds, then removed from the mixer and aerated to obtain the resin-coated sand.

2. Test methods:

Bending strength (kg/cm$^2$): JACT test method SM-1
Sticking point: JACT test method C-1
Hot tensile strength (kg/cm$^2$): JACT test method SM-10

From the results in the foregoing and in Table 1, it will be observed that, in order to achieve a higher strength and a faster cure (represented by the hot tensile strength value at 30 and 60 seconds), a lubricant-containing solid resole resin prepared using a mixture of ammonia and an alkali metal catalyst in combination is preferred to that prepared with an ammonia catalyst alone.

TABLE 1

|  | RUN | | | | CONTROL RUN | | |
|---|---|---|---|---|---|---|---|
|  | 1 | 2 | 3 | 4 | 1 | 2 | 3 |
| Conditions of preparation of resin-coated sand | | | | | | | |
| Ex. 1 (novolac) (g) | 250 | 250 | 350 | 350 | 250 | 350 | 900 |
| Ex. 2 (solid resole resin of the present invention) (g) | 650 | — | — | — | — | — | — |
| Ex. 3 (solid resole resin of the present invention) (g) | — | 650 | 550 | 550 | — | — | — |
| Ref. Ex. 1 (solid ammonia resole resin) (g) | — | — | — | — | 650 | 650 | — |
| Hexamine | — | — | 27 | 45 | — | 45 | 135 |
| Properties of resin-coated sand | | | | | | | |
| Bending strength (kg/cm$^2$) | 44.9 | 46.5 | 43.7 | 42.5 | 35.5 | 33.3 | 43.3 |
| Sticking point (°C.) | 103 | 102 | 104 | 104 | 100 | 103 | 107 |
| Hot tensile strength (kg/cm$^2$) | | | | | | | |
| 30 sec. | 1.8 | 2.4 | 1.7 | 1.8 | 1.1 | 1.4 | 2.1 |
| 60 sec. | 6.5 | 7.3 | 6.7 | 6.9 | 4.3 | 4.9 | 6.9 |
| 240 sec. | 19.5 | 22.1 | 20.3 | 19.8 | 14.5 | 15.3 | 20.6 |

What is claimed is:

1. In a solid phenolic resin composition for binding sand in a foundry sand core or mold prepared by mixing solid novolac and solid resole resin particles, wherein said resole is produced by the reaction comprising condensation of a phenol and a formaldehyde source in the presence of an alkaline catalyst followed by dehydration of the reaction mixture, the improvement comprising adding a lubricant to the resole reaction mixture prior to the completion of the dehydration of the reaction mixture in a proportion of about 0.5 to about 10 parts by weight per 100 parts by weight of the lubricant-containing resole, the solid novolac constituting about 1 part to about 40 parts by weight per 100 parts by weight of the novolac and lubricant-containing resole resins, and the lubricant-containing resole constituting the balance of the composition.

2. The composition of claim 1 wherein the lubricant is selected from the group consisting of carnauba wax, montan wax, paraffin wax, polyethylene wax, aliphatic amides, rosin, a resinous material comprising a complex thermoplastic mixture derived from southern pinewood comprising phenolic constituents in the form of substituted phenolic ethers, polyphenols, and phenols of high molecular weight, polyethyleneglycol, polystyrene, talc, and mixtures thereof.

3. The composition of claim 2 wherein the lubricant is an aliphatic amide or a polyethylene wax.

4. The composition of claim 1 wherein the novolac resin comprises a condensation product of phenol and formaldehyde.

5. The composition of claim 1 wherein the resole resin comprises a condensation product of phenol and formaldehyde.

6. The composition of claim 5 wherein the novolac resin is present in amount of about 1 to about 30 parts by weight based on 100 parts by weight of the novolac and the lubricant-containing resole resins.

7. The composition of claim 6 wherein the lubricant is present in an amount of about 1 to about 7 parts by weight based on 100 parts by weight of the lubricant-containing resole resin.

8. The composition of claim 1 wherein the lubricant-containing resole resin also includes a silane coupling agent.

9. The composition of claim 1 wherein the lubricant is added during the reaction employed to prepare the solid resole resin.

10. The composition of claim 1 wherein the lubricant is added subsequent to the condensation step of the reaction employed to prepare the solid resole.

11. The composition of claim 1 wherein the resole is prepared in the presence of about 0.002 to about 0.10 mole per mole of the phenol reactant of an alkali metal catalyst and about 0.05 to about 0.40 mole per mole of the phenol reactant of an amine catalyst, said alkali metal catalyst being selected from the group consisting of alkali hydroxides, alkali oxides, alkali earth metal hydroxides, alkali earth oxides and mixtures thereof and said amine catalyst being selected from the group consisting of ammonia, monomethyl amine, triethyl amine, ethanolamine, an aniline, and mixtures thereof.

12. The composition of claim 11 wherein the phenolic reactant is phenol.

13. The composition of claim 11 wherein the alkali metal catalyst is an alkali hydroxide present in an amount of about 0.01 to about 0.10 mole per mole of the phenolic reactant.

14. The composition of claim 13 wherein the alkali hydroxide catalyst is sodium hydroxide.

15. The composition of claim 12 wherein the alkali metal catalyst is an alkali earth hydroxide present in an amount of about 0.002 to about 0.02 mole per mole of the phenolic reactant.

16. The composition of claim 15 wherein the alkali earth hydroxide is barium hydroxide.

17. The composition of claim 11 wherein the amine catalyst is ammonia.

18. In the process for preparation of a composition useful as a foundry core or mold consisting essentially of mixing sand and a solid particulate phenolic resin binder therefor at an elevated temperature sufficient to fluidize said solid resin and coat the sand with said resin, the improvement comprising, as said binder, a mixture of a solid novolac phenolic resin and a lubricant-containing solid resole phenolic resin produced by the reaction comprising condensation of a phenol and a formaldehyde source followed by dehydration of the reaction mixture wherein the lubricant is added prior to the completion of the dehydration of the reaction mixture or during said reaction to produce the solid resole phenolic resin, said resole being prepared in the presence of about 0.002 to about 0.10 mole per mole of the phenol reactant of an alkali metal catalyst selected from the group consisting of alkali metal hydroxides, alkali metal oxides, alkali earth metal hydroxides, alkali earth metal oxides and mixtures thereof and about 0.05 to about 0.40 mole per mole of the phenol reactant of an amine catalyst selected from the group consisting of ammonia monomethyl amine, triethyl amine, ethanol amine, an aniline and mixtures thereof, the novolac resin constituting about 1 to about 40 parts by weight per 100 parts by weight of the phenolic resin binder, and the lubricant-containing resole resin constituting the balance of the phenolic resin binder, the proportion of the phenolic resin binder being about 2 to about 5 parts by weight per 100 parts by weight of the sand and the proportion of the lubricant in the lubricant-containing resole resin component being about 0.5 to about 10 parts by weight per 100 parts by weight of the lubricant-containing resole resin component.

19. The process of claim 18 wherein the lubricant is selected from the group consisting of carnauba wax, montan wax, paraffin wax, polyethylene wax, aliphatic amides, rosin, a complex thermoplastic mixture derived from southern pinewood comprising phenolic constituents in the form of substituted phenolic ethers, polyphenols, and phenols of high molecular weight, polyethylene glycol, polystyrene, talc and mixtures thereof, the novolac resin comprises a condensation product of phenol and formaldehyde, the resole resin comprises the condensation product of phenol and formaldehyde, the alkali metal catalyst is an alkali hydroxide, the amine catalyst is ammonia, the mixture of sand and resin also includes hexamine in an amount of up to about 5 parts by weight per 100 parts by weight of the novolac and lubricant-containing resole and the novolac is present in an amount of about 1 to about 30 parts by weight based on 100 parts by weight of the novolac and the lubricant-containing resole.

20. The process of claim 19 wherein the lubricant is added after completion of the condensation step of the reaction to produce the solid resole resin in a proportion of about 1 to about 7 parts per 100 parts by weight of the lubricant-containing resole resin, the lubricant-containing resole also includes a silane coupling agent and the alkali hydroxide catalyst is sodium hydroxide.

21. A product useful as a foundry sand core or mold prepared by the process of claim 18.

* * * * *